United States Patent [19]

Eckart et al.

[11] Patent Number: 4,911,606
[45] Date of Patent: Mar. 27, 1990

[54] METHOD FOR PROVIDING ROTOR WINDINGS

[75] Inventors: Charles E. Eckart; Harlan F. Timm, both of West Allis, Wis.

[73] Assignee: Harnischfeger Corporation, Brookfield, Wis.

[21] Appl. No.: 364,299

[22] Filed: Jun. 9, 1989

[51] Int. Cl.$^4$ .................. B25J 1/00; H02K 15/06
[52] U.S. Cl. ........................... 414/757; 29/598; 29/281.4; 29/732; 29/759; 29/760; 269/296; 414/781
[58] Field of Search ............... 29/732, 735, 736, 598, 29/759, 760, 559, 281.4; 269/296; 414/757, 781

[56] References Cited

U.S. PATENT DOCUMENTS 2,192,801 3/1940 Poole ........................... 29/732
3,921,284 11/1975 Bucholtz et al. ............. 29/732 X Primary Examiner—Carl E. Hall
Attorney, Agent, or Firm—Richard C. Ruppin

[57] ABSTRACT

An apparatus for providing a rotor of an electrical rotating machine in which the apparatus has frame means including a pair of spaced apart support members each having arcuate shaped surfaces engaging opposite shaft ends of a rotor to thereby support the rotor on the frame means. A drive belt has first and second loop ends with the first loop end being positioned around the rotor for driving the latter. Where the rotor includes a commutator, the first loop end may be positioned in engagement with a generally cylindrical surface of the commutator. A drive means, including a pulley around which the second drive belt loop is wrapped, is provided for rotating the rotor to selected winding attachment positions at which winding sections may be attached to the magnetic core of the rotor.

11 Claims, 3 Drawing Sheets

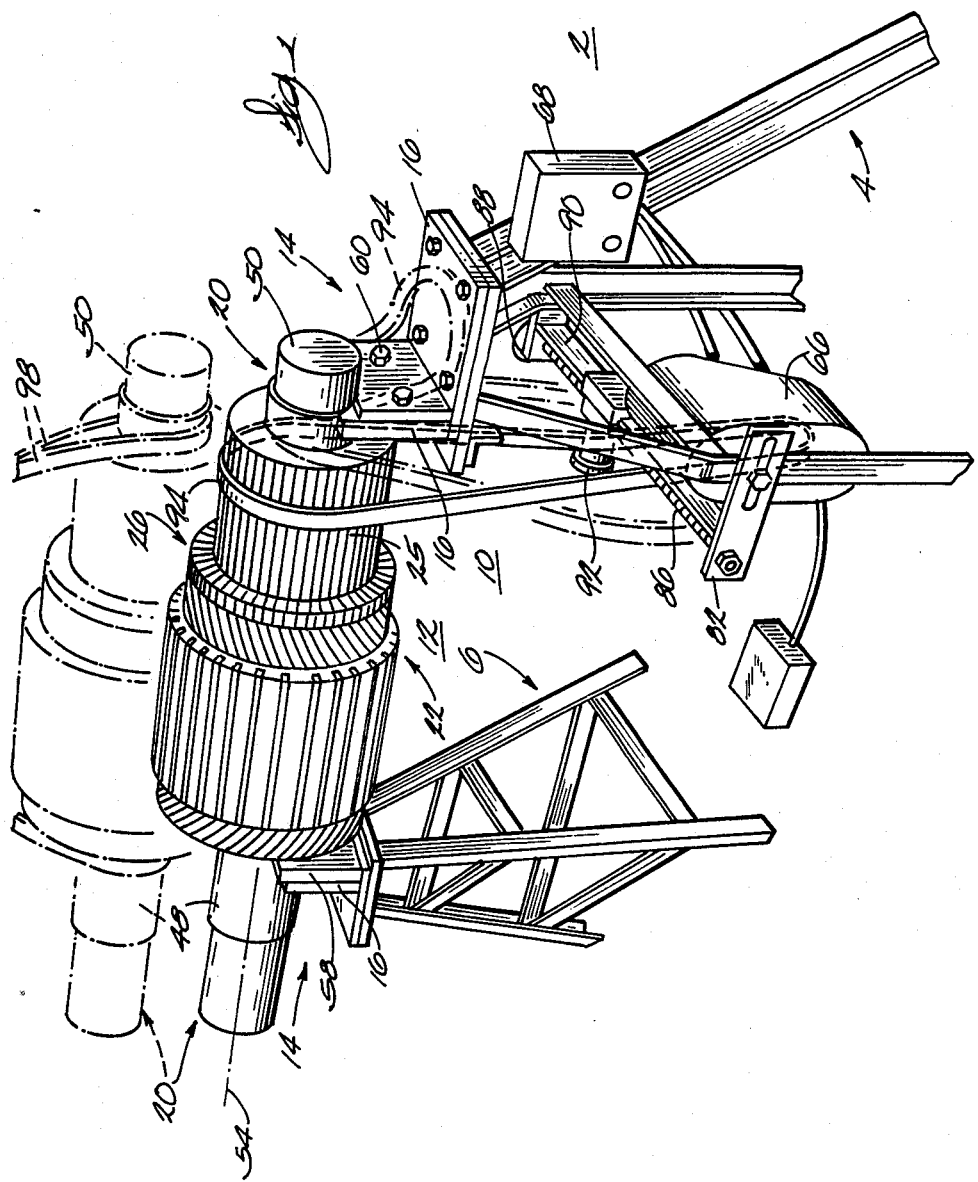

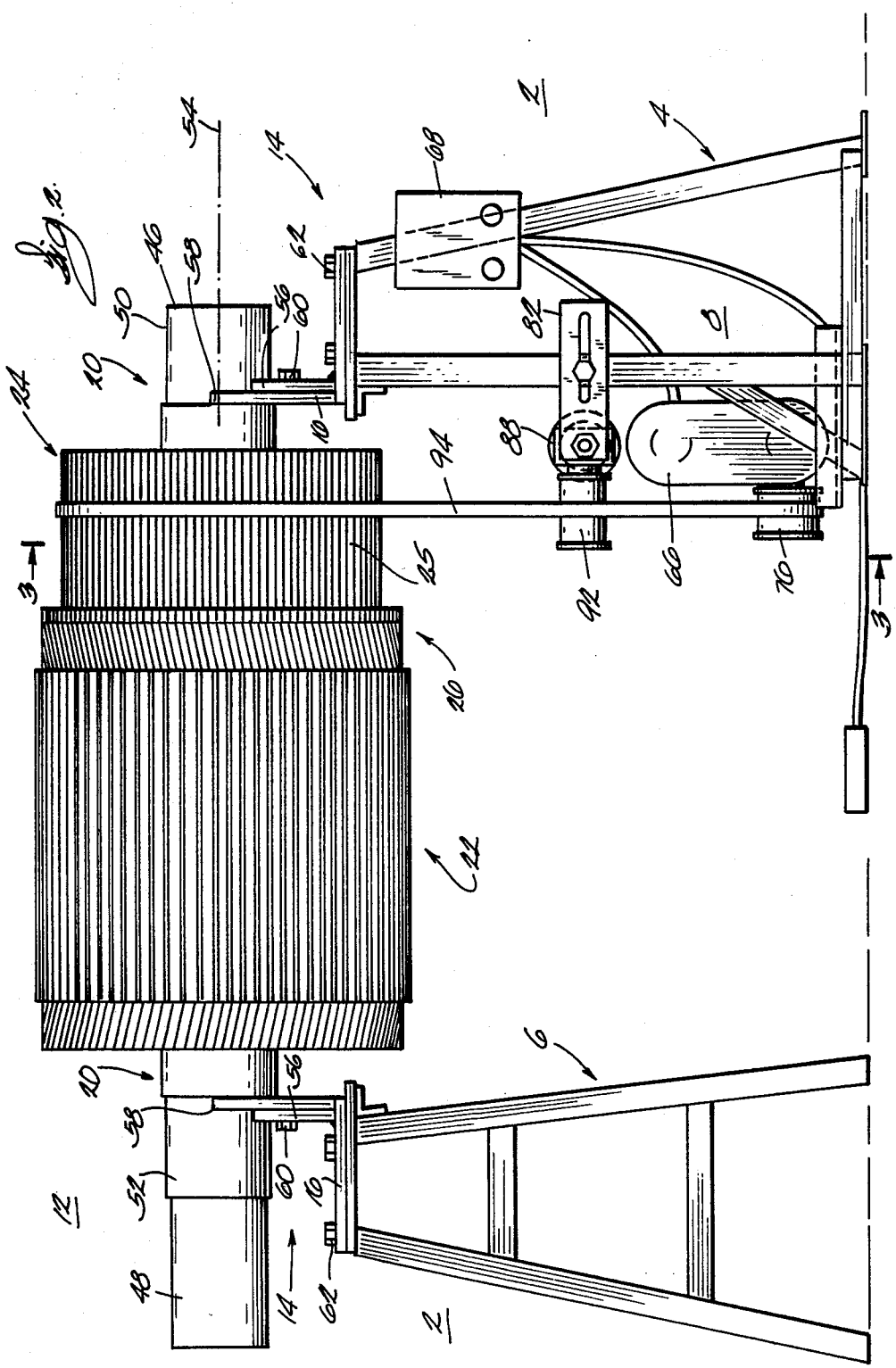

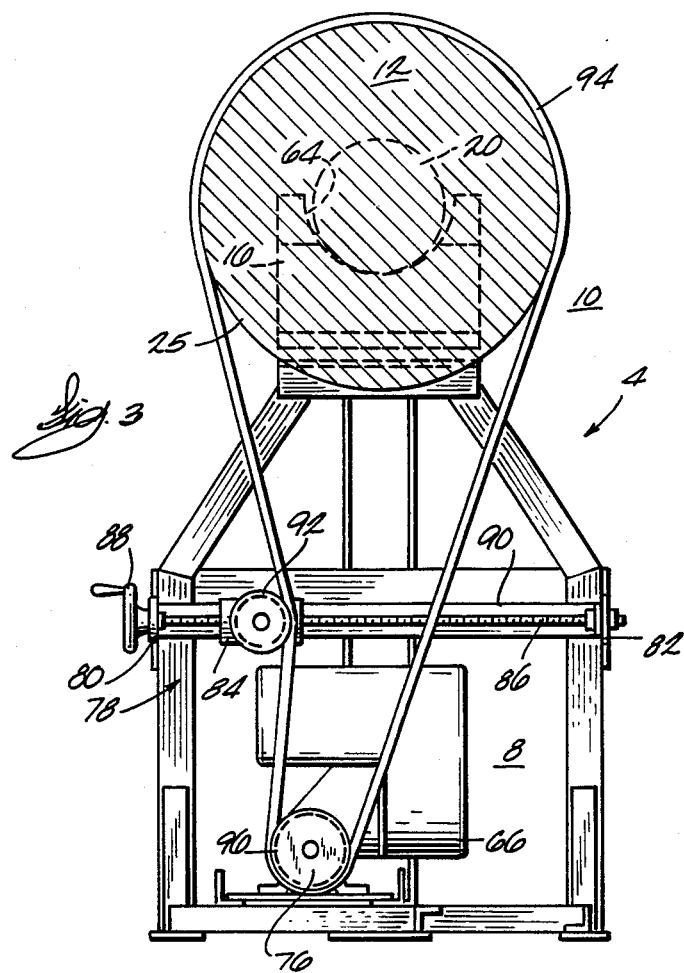
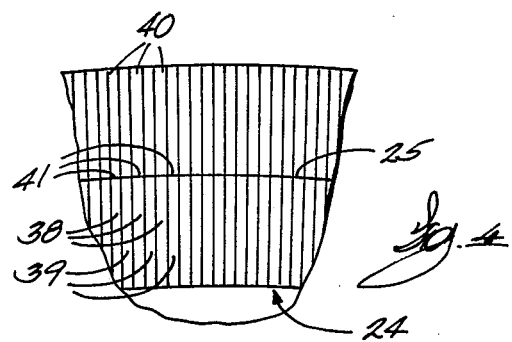

METHOD FOR PROVIDING ROTOR WINDINGS

FIELD OF THE INVENTION

This invention relates to an apparatus and method for winding rotors of electrical rotating machinery. In particular, the invention relates to the rotatable support of rotors and their positioning at selected work positions at which electrical winding sections are attached to the rotor.

BACKGROUND OF THE INVENTION

Electrical rotating machinery such as motors and generators of the direct current type have rotating armature mounted windings in which the winding leads are brought out to commutators where field electrical connections are made. Alternating current motors and generators having wound rotors also may have the winding leads connected to slip rings to enable connection of these windings to external equipment. The installation of armature or rotor windings requires manual placement and attachment of a number of winding sections onto a magnetic core which has been previously attached to a rotatable shaft. Each of the winding sections is inserted into axially extending slots in the core at different circumferential locations along the periphery of the core. The handling of the rotor or armature and the attaching of the winding sections requires care in avoiding damage to winding insulation covering, to slip rings or commutator sections, and to the bearing surfaces of the shaft. The work is particularly difficult since the core must be moved in a sequential fashion to, and held at, a work position for the attaching of several adjacent winding sections and then rotated again to the next work position. The difficulty of the work is increased significantly where the rotors or armatures are of larger and heavier sizes making their movement to each work position and the holding at each position to a considerable strain for the person doing winding work. It should be noted that the term "rotor", as used herein, is intended to mean the rotating member of any electrical machine including the armature of a direct current motor or generator.

SUMMARY OF THE INVENTION

It is a general object of the invention to provide an apparatus and method for winding a rotor of a rotating electrical machine in which the rotor is securely supported and easily driven to and held at each desired winding attachment location without danger of damage to the winding sections or shaft of the rotor.

The invention is carried out by providing an apparatus for use in winding a rotor in which the apparatus has frame means including a pair of spaced apart support members each having arcuate shaped support surfaces engaging opposite shaft ends of a rotor to thereby support the rotor on the frame means. A drive belt has first and second loop ends with the first loop end being positioned around the rotor for driving the latter. Where the rotor includes a commutator, the first loop end may be positioned in engagement with a generally cylindrical surface of the commutator. A drive means, including a pulley around which the second drive belt loop end is wrapped, is provided for rotating the drive belt and thereby rotating the rotor to selected winding attachment positions at which winding sections may be attached to the magnetic core of the rotor.

The arcuate shaped support surfaces engage bearing surfaces on the shaft to support the rotor. Each arcuate support surface may have a radius greater than the radius of the armature shaft at the area of their engagement to facilitate the positioning and retaining of the rotor on the arcuate surfaces of the support means.

To enable positioning of the rotor shaft ends on the arcuate support members, the drive belt has an inoperative position spaced from the rotor and in supported engagement with the frame means to enable positioning of the rotor shaft ends on the support members and the subsequent positioning of the belt around the rotor.

The steps in winding the rotor include supporting the drive belt adjacent to the rotor support means and positioning the rotor on the support means so that it is retained in a rotatable fashion about its shaft axis. The drive belt is then positioned around the rotor and the drive belt is rotated in an intermittent manner to rotate the rotor about the shaft axis to a plurality of winding work positions. At each of the positions to which the rotor is moved, work may be done to attach a winding section to the core of the rotor. At each of the winding attachment work positions, the drive belt is held to thereby also hold the rotor and prevent it from rotating movement.

BRIEF DESCRIPTION OF THE DRAWINGS

Further objects and advantages of the invention will appear when taken in conjunction with the accompanying drawings, in which:

FIG. 1 is a perspective view of the apparatus of the invention with a rotor shown in full lines supported by the apparatus and shown in phantom lines prior to its being supported in engagement with the apparatus;

FIG. 2 is a side elevation view of the apparatus shown in FIG. 1 with a rotor mounted on the apparatus;

FIG. is a section view taken along line 3—3 shown of FIG. 2; and

FIG. 4 is a view of an enlarged portion of the rotor shown in FIG. 2, illustrating details of the commutator.

DETAILED DESCRIPTION OF THE PREFERRED EMBODIMENT

Referring generally to FIGS. 1–3 of the rawings, the apparatus of the invention includes a frame means 2 having spaced apart upright stands 4 and 6, drive means 8 mounted on the stand 4, and a drive belt 10 engaging rotor 12 and the drive means 8 for rotating the rotor 12 in response to operation of the drive means 8. The frame means includes support means 14 having a pair of support members 16 affixed to stands 4 and 6.

The rotor 12 has a shaft 20, a core 22 mounted on the shaft, a commutator 24 mounted on the shaft, and an armature winding 26 mounted on the core and electrically connected to the commutator 24. The winding 26 includes a plurality of insulated winding sections such as winding section 28. The commutator 24 includes a plurality of flat segments such as segments 38 each separated by insulation material layers 39 and each having a riser 40 at an end adjacent the winding 26. Each winding section 28 includes a plurality of wires such as wires 42, each one of which is connected to a riser 40 of a commutator lamination 38. As may be seen in FIGS. 1–3, the laminations 38 of the commutator 24 and the insulation layers 41 between the laminations 38 together form a generally cylindrical surface 25 around which a loop end 94 of the drive belt 10 is positioned for rotating the armature 12. However, the copper material of the commutator laminations 38 is relatively soft and therefore the belt 10 should desirably be of a nonabrasive material which will not damage the laminations 38 when it is placed around the commutator 24. Also, the belt 10 should desirably be of a material and shape which provides a suitable coefficient of friction with the commutator surface 25. Although the commutator surface 25 is generally cylindrical, the laminations 38 of which it is comprised have flat edge surfaces 41 which result in a certain amount of roughness to the surface 25. This roughness is desirable in that it provides increased traction of the belt 10 with the surface 25 which improves the ability of the belt to drive and hold the armature 12.

The shaft 20 includes opposite ends 46 and 48 respectively having bearing surfaces 50 and 52 which support the rotor 12 when it is mounted within the stator of a motor (not shown.) However, in the present invention, the bearing surfaces 50 and 52 are suitable for use in supporting the rotor 12 on the support members 16. The shaft 20 also includes a longitudinal axis 54 about which the rotor 12 is rotatably driven in response to rotation of the drive belt 10 by the drive means 8. The support members 16 may be identical and are positioned facing each other. Each support member 16 includes an angle support 56 and a plate support 58 attached to the angle support by suitable means such as threaded bolts 60. The angle supports 56 are also affixed to the upright stands 4 and 6 by suitable means such as bolts 62. Each plate support 58 includes an arcuate shaped support surface 64 which is radially open in an upward direction for retaining the ends of the shaft 20. The plate support 58 is of a suitable material which is softer than the bearing surface of the shaft which it engages to prevent damage to the bearing surface during rotation of the armature. For example, the plate support 58 may be of a fiber reinforced rubber or plastic material which is softer than the shaft bearing surface but at the same time provides some friction with the shaft to prevent rotation of the rotor 12 when it is not being driven by the drive means 8. The arcuate surfaces 64 also have a radius which may be larger than the radius of the shaft ends 46 and 48 to enable positioning of the shaft ends in the support members 16 without damaging the bearing surfaces. The larger diameter of arcuate surfaces 64 also permits a variety of sizes of rotors to be supported by each pair of support members 16.

The drive means 8 includes a belt tensioner 78 and an adjustable speed gear motor 66 connected to a suitable electrical power source (not shown). The speed and direction of rotation of the motor 66 is controlled by a manually operated control 68 which includes a foot pedal 70 for controlling motor speed and pushbuttons 72 and 74 for determining motor rotation direction. The drive means 8 also includes a drive pulley 76 extending from the motor 66 about which a second loop end 96 of the drive belt 10 is positioned for rotating the commuttor 24 and thereby the rotor 12 in response to operation of the motor 66. The belt tensioner 78 is mounted on the upright stand 4 and includes end support brackets 80 and 82, a threaded shaft 86 rotatably affixed to the end support brackets 80 and 82, a handle 88 for rotating the threaded shaft, a pulley carriage 84 slideably mounted on a carriage guide 90, and a tension pulley 92 rotatably mounted on the carriage 84.

The winding apparatus is used in the installation of the winding 26 on to the rotor 12 by lifting the rotor up and positioning it in a retained position on the support members 16. With reference to FIG. 1, the rotor 12 is shown in phantom lines being held above the support members 16 by means of a lifting sling 98 connected to the hook of a hoist (not shown) prior to lowering the rotor 12 to its position shown in full lines supported by the support member 16. The sling is wrapped around the shaft ends 46 and 48 in such a manner that it may be readily removed upon positioning the shaft bearing surfaces 50 and 52 in engagement with the arcuate support surfaces 64. Prior to positioning the bearing surfaces in engagement with the arcuate support surfaces, the drive belt 10 is positioned such that it is supported by the upright stand 4 around an arcuate surface 64 and clear of the arcuate surface, as shown in phantom lines in FIG. 1. The shaft ends 46 and 48 are then lowered to their position engaging the arcuate surfacs 64 of the support members 16. Since the belt loop end 94 is positioned to the outside of the shaft end 46 and the stands 4 and 6, that is, not in the space between the stands 4 and 6, it is free to be positioned around the commutator 24. Also, if it is necessary in the positioning of the drive belt 10 such that it clears the arcuate surface 64 satisfactorily, the loop end 96 of the drive belt may also be positioned free of the drive pulley 76. After the rotor 12 is in its retained position supported by the support members 16, the drive belt 10 is positioned with its loop end 94 around the commutator surface 25 and its loop end 96 around the drive pulley 76. The tension pulley 92, which may have been previously moved to a position away from the drive belt 10 is thn advanced by rotation of the handle 99 and threaded shaft 86 to move the tension pulley 92 against the belt 10 so it will be adequately tight to drive the commutator 24.

By depression of one of the control pushbuttons 72 or 74 and depression of the foot pedal 70, an operator may now control the motor 66 to rotate the drive belt 10 and thereby the commutator 24 and rotor 12 intermittently to each working position at which the operator desires to install a winding section 28 on the core 22. At each work position, the rotor 12 is held from rotating by the holding action of the gear motor acting through the tensioned belt 10. As a result, the operator does not have to manually rotate the rotor to each work position or hold the rotor at each position. Both holding and rotating of the rotor becomes particularly difficult with larger rotors and increases in difficulty when a portion of the winding sections 28 are installed on the rotor so that it becomes unbalanced. Following the installation of all winding sections 28 and their electrical connections to the commutator laminations 38, the tension pulley 92 is moved in a direction away from the belt 10, the belt is slipped off of the commutator 24 and supported on the support means 16 of the stand 4 around the arcuate surface 64 and clear of the shaft end 46. The lifting sling 98 is then wrapped around the shaft ends 46 and 48 and connected to the hoist. The rotor 12 is then lifted away from the frame means 2 to the position shown in phantom lines in FIG. 1.

A winding apparatus and method has been disclosed in which the commutator of the rotor armature winding is used to rotate the rotor to work positions required by the personnel installing the winding on the rotor. By using a drive belt engaging the commutator, the rotor may be driven to each desired winding installation work position and held at that position by applying tension to the belt and thereby to the commutator and holding the belt in the necessary position. The rotor may be supported at a height convenient to the operator working on the rotor and in a manner such that the rotor components such as the shaft ends, the commutator and the winding are not subject to undesired engagement with other objects which may damage them.

It will be understood that the foregoing description of the present invention is for purposes of illustration and that the invention is susceptible to a number of modifications or changes none of which entail any departure from the spirit and scope of the present invention as defined in the hereto appended claims.

What is claimed is:

1. In an apparatus for use in providing a rotor with an armature winding, the rotor having a shaft including opposite shaft ends, a core mounted on the shaft and having a generally cylindrical surface, the combination comprising:

frame means; a pair of spaced apart support members mounted on the frame means and each having an arcuate shaped support surface for engaging and supporting a respective one of the shaft ends;

a drive having first and second loop ends, the first loop being positioned around and in engagement with commutator surface; and drive means including a pulley around which the second drive belt loop end is wrapped for driving the drive belt and thereby rotating the commutator and rotor to selected widing attachment positions.

2. The combination according to claim 1 wherein the shaft has surfaces at said opposite ends and each shaped support surface engages a bearing surface.

3. The combination according to claim 2 wherein each arcuate support surface has a radius greater than of the rotor shaft at the area of engagement surface and the bearing surface.

4. The combination according to claim 2 wherein each arcuate shaped surface is of a relatively soft material to avoid damaging the bearing surfaces.

5. The combination according to claim 1 wherein each arcuate shaped support surface has a radius greater than the radius of the rotor shaft at the area of engagement of the support surface and the shaft end.

6. The combination according to claim 1 wherein the drive means includes holding means for holding the rotor stationary at each selected winding attachment position.

7. The combination according to claim 1 wherein the first loop end of the drive belt has an inoperative position spaced from the rotor and in supported engagement with the frame means whereby the drive belt is clear of the rotor during positioning of the rotor shaft ends on the support members.

8. The combination according to claim 7 wherein:

the commutator comprises a plurality of spaced apart segments each having a flat edge surface and a plurality of insulation layers each one of which is between two adjacent segments; and the commutator cylindrical surface comprises the flat edge surfaces of the plurality of segments whereby a high traction surface is provided for engagement with the drive belt.

9. The combination according to claim 1 wherein:

the commutator comprises a plurality of spaced apart segments each having a flat edge surface and a plurality of insulation layers each one of which is between two adjacent segments; and the commutator cylindrical surface somprises the flat edge surfaces of the plurality of segments whereby a high traction surface is provided for engagement with the drive belt.

10. In an apparatus for use in providing a winding on a rotor of an electrical machine, said rotor including a shaft having opposite shaft ends and a core mounted on the shaft, the combination comprising:

frame means; a pair of spaced apart support members mounted on the frame means and each having an arcuate shaped support surface for engaging and supporting a respective one of the shaft ends;

a drive belt having first and second loop ends, the first loop end being positioned around the rotor for rotating the latter; and drive means including a pulley around which the second drive belt loop end is wrapped for driving the drive belt and thereby rotating the rotor core to selected winding attachment positions.

11. The combination according to claim 10 wherein each arcuate shaped support surface has a radius greater that the radius of the rotor shaft end at the area of engagement of the support surface and the rotor shaft end.

* * * * *